US011805090B1

(12) United States Patent
Kattel

(10) Patent No.: US 11,805,090 B1
(45) Date of Patent: Oct. 31, 2023

(54) METHOD, APPARATUS, AND SYSTEM FOR SECURING ELECTRONIC MESSAGES

(71) Applicant: Anup Kattel, Leumeah (AU)

(72) Inventor: Anup Kattel, Leumeah (AU)

(73) Assignee: SAFECRET PTY LTD, Sydney (AU)

( * ) Notice: Subject to any disclaimer, the term of this patent is extended or adjusted under 35 U.S.C. 154(b) by 0 days.

(21) Appl. No.: 17/984,231

(22) Filed: Nov. 9, 2022

Related U.S. Application Data

(60) Provisional application No. 63/277,575, filed on Nov. 9, 2021.

(51) Int. Cl.
*G06F 15/16* (2006.01)
*H04L 51/226* (2022.01)
*H04L 9/08* (2006.01)

(52) U.S. Cl.
CPC .......... *H04L 51/226* (2022.05); *H04L 9/0825* (2013.01)

(58) Field of Classification Search
CPC ............................ H04L 51/226; H04L 9/0825
USPC ......................................................... 709/206
See application file for complete search history.

(56) References Cited

U.S. PATENT DOCUMENTS

| | | | | |
|---|---|---|---|---|
| 7,010,566 B1* | 3/2006 | Jones | ................... | H04L 63/1441 709/216 |
| 7,849,309 B1* | 12/2010 | Brown | ................ | H04L 63/0876 713/168 |
| 7,984,497 B2* | 7/2011 | Carpenter | ................ | H04L 63/12 713/153 |
| 8,533,801 B2* | 9/2013 | Carpenter | ................ | H04L 63/12 713/153 |
| 8,649,274 B2* | 2/2014 | Brown | .............. | H04W 12/0471 370/242 |
| 9,015,262 B2* | 4/2015 | Luber | ................... | H04L 51/214 709/206 |
| 9,030,946 B2* | 5/2015 | Brown | .............. | H04W 12/0471 713/168 |
| 9,510,202 B2* | 11/2016 | Brown | .............. | H04W 12/0471 |
| 9,515,976 B2* | 12/2016 | Talwar | .................... | H04L 51/23 |
| 9,544,323 B2* | 1/2017 | Porcello | ............. | H04L 63/0272 |
| 9,674,219 B2* | 6/2017 | Selander | ............. | H04W 12/122 |
| 9,923,855 B2* | 3/2018 | Kursun | ................. | H04L 51/226 |
| 10,039,003 B2* | 7/2018 | Maragoudakis | ...... | H04L 63/107 |
| 10,440,578 B2* | 10/2019 | Maragoudakis | .... | H04L 63/0853 |
| 10,555,175 B2* | 2/2020 | Maragoudakis | .... | H04L 63/0853 |
| 10,560,439 B2* | 2/2020 | Seetharam | ............. | G06F 21/10 |
| 10,757,056 B2* | 8/2020 | Vendrow | ................ | H04L 51/42 |
| 10,856,152 B2* | 12/2020 | Maragoudakis | .. | H04M 1/72412 |

(Continued)

*Primary Examiner* — Alicia Baturay
(74) *Attorney, Agent, or Firm* — WHITE-WELKER & WELKER, LLC; Matthew T. Welker, Esq.

(57) ABSTRACT

A delayed messaging application that allows a user to leave future messages for one or more recipients. The application maintains regular contact with the user and release of the messages is initiated upon a failure to confirm the continued existence of the user. A user first writes one or more messages they would like delivered to one or more recipients at some point in the future, based on a triggering event. For each message, a ping controller configurable in a secure message mode wherein the message is inaccessible and the ping controller periodically pings an electronic device according to the settings and receives responses to pings. Responsive to a lack of one or more responses to one or more pings the ping controller is configured to enter an unsecured message mode wherein the message is accessible.

20 Claims, 22 Drawing Sheets

(56) References Cited

U.S. PATENT DOCUMENTS

| | | | |
|---|---|---|---|
| 11,057,336 B2* | 7/2021 | Quintero | G06Q 10/06 |
| 11,212,679 B2* | 12/2021 | Maragoudakis | H04M 1/72412 |
| 11,240,573 B2* | 2/2022 | Grammel | H04B 10/25 |
| 2021/0358586 A1* | 11/2021 | Cline | G06F 21/606 |
| 2022/0408253 A1* | 12/2022 | Ghalaieny | H04W 8/183 |

* cited by examiner

On a regular basis, ping me every

| 12 months |

If I don't respond to a regular ping, on escalated mode, ping me every

| Month |

Finally, release my message if I don't respond to the escalated pings for

| 3 times |

Fig. 10

New message

Message Title

Example Message to peanut about chess

Above text is only for you to identify this message on the list of message in your account. Please avoid any sensitive information as it is not encrypted.

Message

Please enter your message

Next  Back

New message

◯ 1    ◯ 2    ◯ 3

On a regular basis, ping me every

| 12 months |

If I don't respond to a regular ping, on escalated mode, ping me every

| Month |

Finally, release my message if I don't respond to the escalated pings for

| 3 times |

[Next] [Back]

Fig. 13

Read Message

Please enter your read code

Please enter your read code

☐ I agree to the terms and conditions.

For security reasons we will send a six digit code to your email or mobile. Please use the following button to receive it.

Send Code

Fig. 14

Verification

A six digit code has been sent to your email or mobile. Please allow it some time and for emails, please also check spam/junk folders.

Please enter the six digit code we sent to your email.

Example 123456

Verify

Fig. 15

METHOD, APPARATUS, AND SYSTEM FOR SECURING ELECTRONIC MESSAGES

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

The present invention relates generally to electronic message security systems. More specifically, the present invention relates to a method, apparatus, and system for securing electronic messages.

BACKGROUND OF THE INVENTION

Most of us think of our last words as conversations that happen while we're closest to death. It may be our final opportunity to express our love, share memories, or even address regret. Unfortunately, many people pass way unexpectedly, or are unable to express their final words when the reach the final period of their life and want to do so.

While end-of-life letters can be written at any time, many are reluctant to do so for fear that they will never be delivered, will not reach their intended recipient, or the content of an unsecured written letter will not be kept in confidence.

Thus, what is needed, is a way to enable end of life letters and messages to be securely created and stored, with a trackable triggering event controlled by the deceased, that allows for the transmission of these letters and messages, in a secure and encrypted manner to the intended recipients at some period after the person has passed away.

In our increasingly connected and electronic society, such a system would be desired to be delivered to a user and controlled by a user through a software application, with transmission of the letters and messages after a death, being done in an encrypted manner to only intended recipients, which extends beyond the merely calendaring or scheduling of messages or events.

DEFINITIONS

Unless stated to the contrary, for the purposes of the present disclosure, the following terms shall have the following definitions:

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

"Email" or "electronic messages" is defined as a means or system for transmitting messages electronically as between computers or mobile electronic devices on a network.

"Email Client" or more formally mail user agent (MUA) is a computer program used to access and manage a user's email. A web application that provides message management, composition, and reception functions is sometimes also considered an email client, but more commonly referred to as webmail.

"ESP" is an abbreviation for email service providers, which are companies that provide email clients enabling users to send and receive electronic messages.

"Electronic Mobile Device" is defined as any computer, phone, smartphone, tablet, or computing device that is comprised of a battery, display, circuit board, and processor that is capable of processing or executing software. Examples of electronic mobile devices are smartphones, laptop computers, and table PCs.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating on the Internet.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from where ever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component.

Simple Mail Transfer Protocol (SMTP) is an Internet standard for electronic mail (email) transmission.

"SMTP Relay", which stands for Simple Mail Transfer Protocol, lets you send email messages through your email account using your existing email service.

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "smartphone" (or smart phone) is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

A "computer system" or "system" consists of hardware components that have been carefully chosen so that they work well together and software components or programs that run in the computer. The main software component is itself an operating system that manages and provides services to other programs that can be run in the computer. The complete computer made up of the CPU, memory and related electronics (main cabinet), all the peripheral devices connected to it and its operating system. Computer systems fall into two categories: clients and servers.

Clients are the user's laptop, desktop and tablet computers and smartphones, while servers share their data and applications with multiple users.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client-server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

SUMMARY OF THE INVENTION

There is provided herein a method, apparatus, and system for securing electronic messages. The method, apparatus, and system comprises a repository server comprising data storage storing electronic messages (and any attachments in embodiments), and settings in relation to the messages.

The server comprises a processor executing computer program code instruction controllers including a user interface controller exposing a user interface for configuring of the electronic messages and settings. The processor further executes a ping controller.

For each message, the ping controller configurable in a secure message mode wherein the message is inaccessible and the ping controller periodically pings an electronic device according to the settings and receives responses to pings.

Responsive to a lack of one or more responses to one or more pings the ping controller is configured to enter an unsecured message mode wherein the message is accessible.

After entering the unsecured message mode, an encryption controller of the server may decrypt the message.

The ping controller may operate by sending Internet Control Message Protocol (ICMP) echo request packets to an electronic device and waiting for an ICMP echo reply. Other types of pings may be employed by the ping controller, including electronic communication and mobile notification type pings.

The electronic device may execute a ping response controller which responds to the pings. The electronic device may comprise a ping listener controller which executes as a background process which automatically responds to the ping requests.

In embodiments, the ping controller is configured to go from a first ping mode to a second ping mode responsive to a lack of one or more responses to one or more pings.

During the second ping mode, the ping controller may transmit pings at a higher frequency, transmit pings to another electronic device or require enhanced verification or authentication.

The server may cryptographically sign pings with a private key of a cryptographic key pair that may be a common key pair across the system or otherwise a key pair associated with a recipient electronic device or user account. The signatures are verified by the ping response controller using the corresponding public key of the cryptographic key pair.

Similarly, responses by the electronic device may be cryptographically signed using the same or another cryptographic key pair for verification by the server.

The ping response controller may require enhanced verification such as via provision of a key (such as a PIN, password or the like) for the verification of the ping, or the cryptographically signing of the response. The key may be used to securely access a private key stored by a security hardware module of the electronic device.

The user may store the cipher text or encrypted data of a message or its attachments on a further electronic device, such as an air gapped electronic device not connected to the server via a wide area network. In accordance with this embodiment, the server may display the cryptographic key usable by the encryption controller of the further electronic device to encrypt or decrypt the message or message related data such as its attachments.

The message (and any attachments and/or associated data) may be further secured by a cryptographic key generated for the user on the server or on the user electronic device, or by a key derivation password generated on the server or the user electronic device, or by a key derivation password input by the user. This key may be provided to the recipient by the user themselves or by the system but is not stored on the system thereby preventing decryption of the electronic message using data stored on the server by itself.

The user interface controller may be configurable in an invisible mode wherein stored messages are not evident via the user interface or alternatively in a read-only mode wherein stored messages are not writable so as to prevent against tampering of messages in the event of unauthorized access.

When receiving a first message, an encryption controller of the server or the client electronic device may be configured for generating a cryptographic key pair for which the public key thereof may be used for encrypting subsequent messages associated with electronic device or user account or with the recipient identifier such as user id, email id, mobile number, etc.

In embodiments, the private key of the cryptographic key pair is provided to the recipient's electronic device or recipients address during the creation of the cryptographic key pair but is otherwise not stored by the server, to thereby prevent decryption of the electronic message using data stored by the server itself. The key pair may be alternatively generated on recipient's electronic device and the device security hardware module may be used to secure the private key while the public key may be sent to the server for future encryptions for the same recipient.

In embodiments, the method, apparatus and system of detecting users demise may be connected to trigger any other events outside of sending messages including but not limited to closing bank accounts, stopping mobile plans or subscriptions, notifying landlords and debtors, notifying sperm/egg banks, posting on social media accounts, closing social media account, disclosing will/testament location, notifying person's lawyers, alerting funeral agencies, etc.

Other aspects of the invention are also disclosed.

BRIEF DESCRIPTION OF THE DRAWINGS

The accompanying drawings, which are incorporated herein form a part of the specification, illustrate the present invention and, together with the description, further serve to explain the principles of the invention and to enable a person skilled in the pertinent art to make and use the invention.

FIG. 10 is a simple GUI input screen taught by the present invention.

FIGS. 11-13 are screen shots of the GUI taught by the present invention and the three page/step process for writing a message for later delivery within the system.

FIG. 14 is a screen shot of the GUI requesting a read message code.

FIG. 15 is a screen shot of the GUI requesting entry of verification information.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the present invention.

The present invention is a platform (website and mobile apps) to leave future/delayed messages for a user's loved ones. The system reaches out to a user on a regular basis and releases their messages if it's unable to get in touch with them. A user can write a message and the app pings the user at a set interval and releases the message when it's unable to get a user's response for a set number of times. This is accomplished through a simple GUI input as shown in FIG. 10.

Now referring to FIGS. 11-13, screen shots of the GUI taught by the present invention and the three page/step process for writing a message for later delivery within the system.

Figure 11:
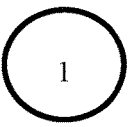
Figure 11:
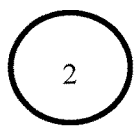
Figure 11:
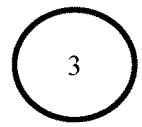

In a first step shown in FIG. 11, a new message is created by entering a recipients name, and contact information for message delivery such as an email (shown) or other manners, such as a phone number for text or SMS delivery, or app handles for message services for one or more social medial applications. The sender can also set the recipients language preference for the message. The language may be used for system communication messages to the recipient such as emails and text messages.

Figure 12:
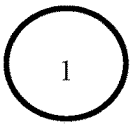
Figure 12:
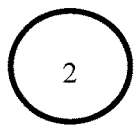
Figure 12:
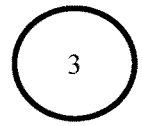

In a second step shown in FIG. 12, the sender/user enters a message title and message text. The message title is only for the user/sender to identify the message form a list of messages in their account and is not part of the message and is not subject to the encryption protection of the message content/body.

FIG. 13, like that of FIG. 10, shows the GUI present to a user for setting the intervals for their regular pings, and the ability to set an escalated ping mode if the system doesn't record a confirmation from a regular ping. Finally, the user can set or select a number of times to trigger release of their messages if they fail to respond to one or more escalated pings.

Figure 16:
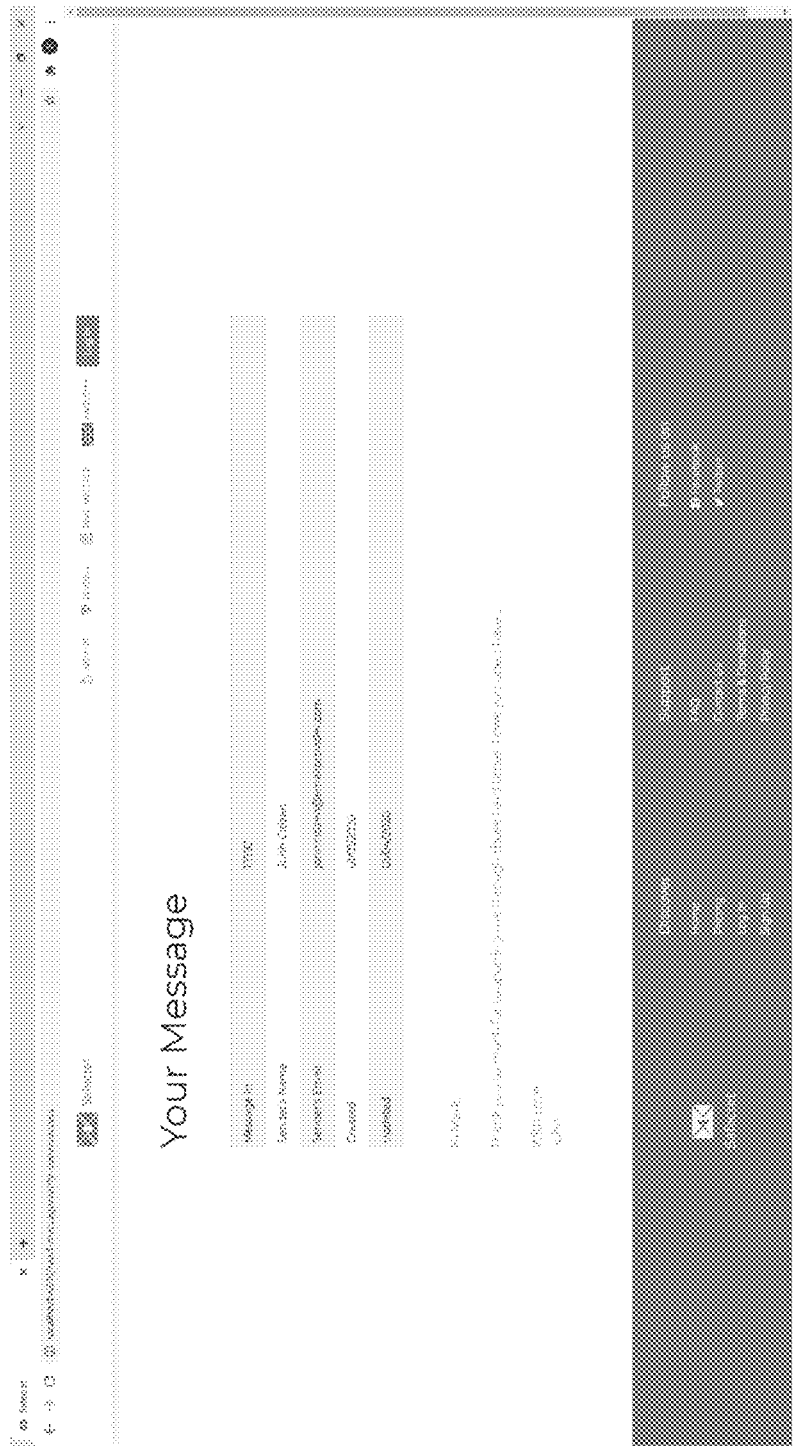
FIG. 16 is a screen shot of the GUI displaying message information.

FIG. 14 is a screen shot of the GUI requesting a read message code. FIG. 15 is a screen shot of the GUI requesting entry of verification information. FIG. 16 is a screen shot of the GUI displaying message information.

In its broadest embodiment, a user writes a message and configures three values: regular ping interval, escalated ping interval and number of pings (ping-limit) as shown in FIG. 10. The app pings users via email and mobile notifications at the set regular intervals and expects the user to respond to the ping. (SMS could be added later) [Mobile notification is called "push notification" on iPhones only. Android just calls it notifications]. If the user doesn't respond, the app starts pinging more often using the escalated ping interval. After pinging for the set number of times, the message gets released to the recipient via an email/SMS link to read the message.

Previously the system taught a button/link in the email to respond to the email ping or you could just tap on mobile notifications to respond. For security reasons (to avoid others from responding), now a user must login to the website using username/password or login to the app using a 4 digit pin.

To avoid accidental release of the messages due to Pings not reaching the user (because of bugs, errors, exceptions, etc.), the system allows multiple mediums. Users can use mobile notifications along with emails in the MVP release. SMS notifications and may be other mediums such as IoT devices, phone calls, letters, social media DMs, etc. may be added in future.

When releasing the system checks the pre-calculated release date, estimated and actual number of pings, and the clearing of the next ping date done by the ping algorithm. This is to make sure the messages don't get released accidentally (due to bugs, system errors, exceptions, etc.)

In the event someone gets access to a user's account, they won't be able to read a user's message content. Messages in this invisible mode are invisible to even themselves. A user cannot view the content but a user can update/replace them. Simplest way for someone accessing/hacking into your account would be by having/getting access to a user's email account—they can request a password reset link sent to the email, they can also request OTP (one time password) required to open messages.

One downside of this feature is, if someone else logs in to the sender's account, replaces the message and deletes the email notification (Message Updated Notification Email) that gets sent to the user, the sender/user would think that it's still their old message and would remain unknown to this attack. To avoid this, they can combine this with a Final/Read-only Mode.

In a final/ready mode embodiment, in the case where a user thinks someone may gain access to their account now or after they pass away, writing messages in final/read only mode will prevent a user's message from getting modified, replaced, or deleted once this mode is activated. However, it means that even the user themselves won't be able to modify, replace, rewrite, or delete the message. In an alternative embodiment, the system may allow the user to contact the system administrators, verify themselves and get support/admin to delete the message in future. It may also protect the messages from getting intentionally deleted by your partner, children, default heirs, etc.

Extreme encryption may be incorporated into alternative embodiments of the present invention. In this mode, the user keeps the key and passes it to the recipient themselves. They can pass it by telling the recipient upfront, or by keeping the key where the recipient can find it (and can inform them of the key's location via another message or we might add an unencrypted field in the same message just for this purpose). The key may also be passed using key rings, gifts, merchandise items, etc. or the system can add a feature to get the system to pass the key anonymously to the recipient.

Offline encryption may be used in yet another alternative embodiment of the present invention and is designed to leave super sensitive stuff such as Bitcoins and other cryptocurrencies, especially for the users that do not want to trust the system. To avoid the need to put their unencrypted data on the internet at all, users can download an offline encryption app or they can do so using any encryption tools/libraries that may come in-built with the OS or they can download and install such tools. User notes-down the encryption key and leaves it somewhere safe for the recipient or passes it to the recipient right away, in a similar way to passing the key for extreme encryption (above). Here, the User only provides encrypted data to the system, which is further encrypted by the system to prevent the recipient or an attacker from grabbing it before it is released. Here, if the system doesn't double encrypt and someone gets access to the offline encrypted data, they would just need obtain the key from the user to read the message before they pass away.

Offline encryption is ideal for leaving cryptocurrencies to the recipient (can leave the wallet private key, wallet key, account login, etc.) Or a special feature to hold cryptos may be built in future.

At the moment, the present invention is only being applied to text messages that a user can write/leave with a maximum of about 2.7k words in English, 5.5k Unicode characters (Chinese, Japanese, etc.). In the future, there may be multimedia messages such as pictures, sounds, videos, attachments, etc.

When a user establishes a setup PIN (or biometric) login to the system on the mobile app, an asymmetric key pair is generated (currently Elliptic Curve). In some systems, the private key is permanently locked/secured inside TPMs, TEEs, iOS secure enclaves, android strongbox, etc. It can be set to be erased upon passcode or biometric change on the device's lock screen. With a private key very secure in the client system, the public key is sent to the server during the device registration. Some sensitive requests from the device are signed with the private key ECDSA to verify the authenticity and to bypass second factor authentication such as Email/SMS OTP and TOTP. In seamless ping, as long as the device is connected to the internet, the device sends a signed response to the pings from the server and the server assumes the user is still around. The assumption is when the user passes away, their phones will not be connected to the internet/turned off or erased. Users will be able to turn seamless ping on/off in the app settings. The system can still fall back to mobile notifications and email/SMS pings after the app is unreachable as a backup/secondary check.

The mac address of the device is not accessible by mobile apps. Apple devices do provide UUID per app installation, but the EC key that is already used for PIN/biometric login and for second factor should be enough. Androids have hardware, IMEI, SN, and user identifiers but they are also moving towards privacy and starting to hide it from apps.

In yet another alternative embodiment, the possibility of sending an IoT device that the user can keep connected to their home WiFi and would respond to the ping seamlessly/silently. Assuming that the user's possessions get stored away when they pass away, this device would also lose power or run out of battery if it's rechargeable and the system would register that. Or the location of the device may also be used to approximate the user's passing. We might end up giving users different options to choose from.

The system can then fallback to email/SMS/mobile pings if the user want's a second layer to prevent accidental release.

Previously, the system had a feature to generate one RSA key-pair per recipient and let the recipient keep the private key to themselves for decryption (to read the messages addressed to them from any sender). The system would store their private key against their email id. This would only happen the first time a user/sender leaves a message to that user in this mode. For subsequent senders, the same public key can be used for encryption. When the user submits/saves the message, the system encrypts the message using the recipient's public key—meaning only the recipient can decrypt and read that message. Neither the system nor the sender would be able to read that. However, the sender could still replace/update the message by writing it from scratch and the system would encrypt the new version with the same public key.

One downside of this was, if someone else logged in to the sender's account and replaced the message and deleted the email notification (Message Updated Notification Email), the sender would think that it's still their old message and be unknown to this attack. To fix this, users can combine this with Final/Read-only Mode.

This feature was deprecated in favor of extreme encryption, which is more secure (AES 256>RSA 4096). Plus, extreme encryption also allows the sender to decrypt/read the message for themselves and modify it instead of rewriting. This asymmetric encryption feature, however, may come back in future if deemed useful for this or another reason/usage.

Figure 1:
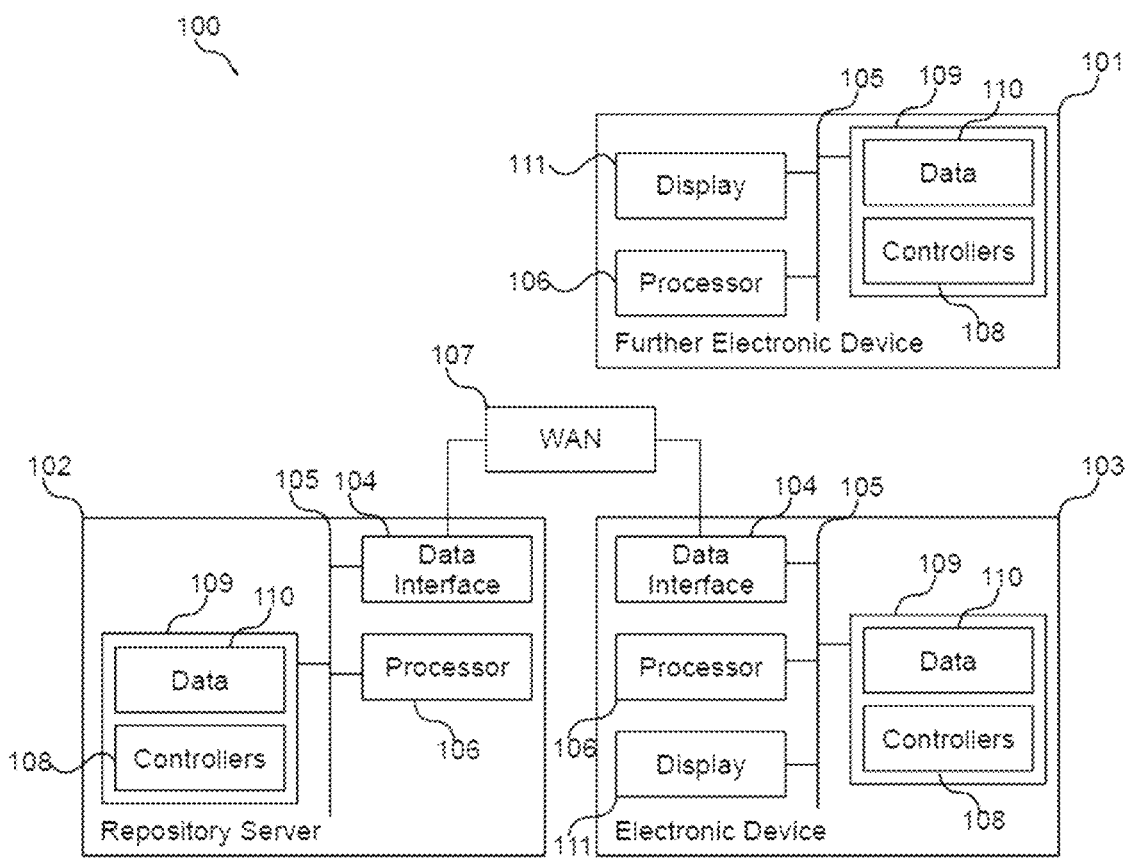
FIG. 1 shows a system for securing electronic messages.
Figure 2:
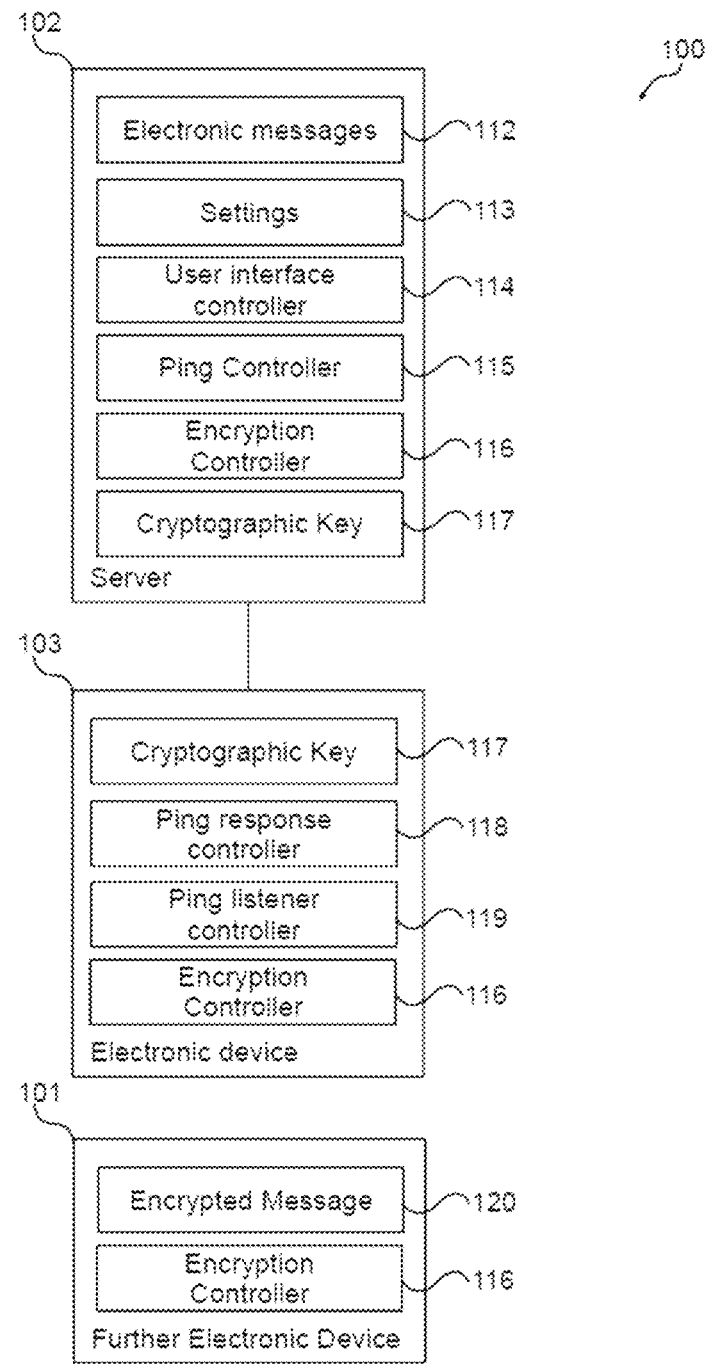
FIG. 2 shows data and computer program code instruction controllers of the system in further detail in accordance with an embodiment.
Figure 3:
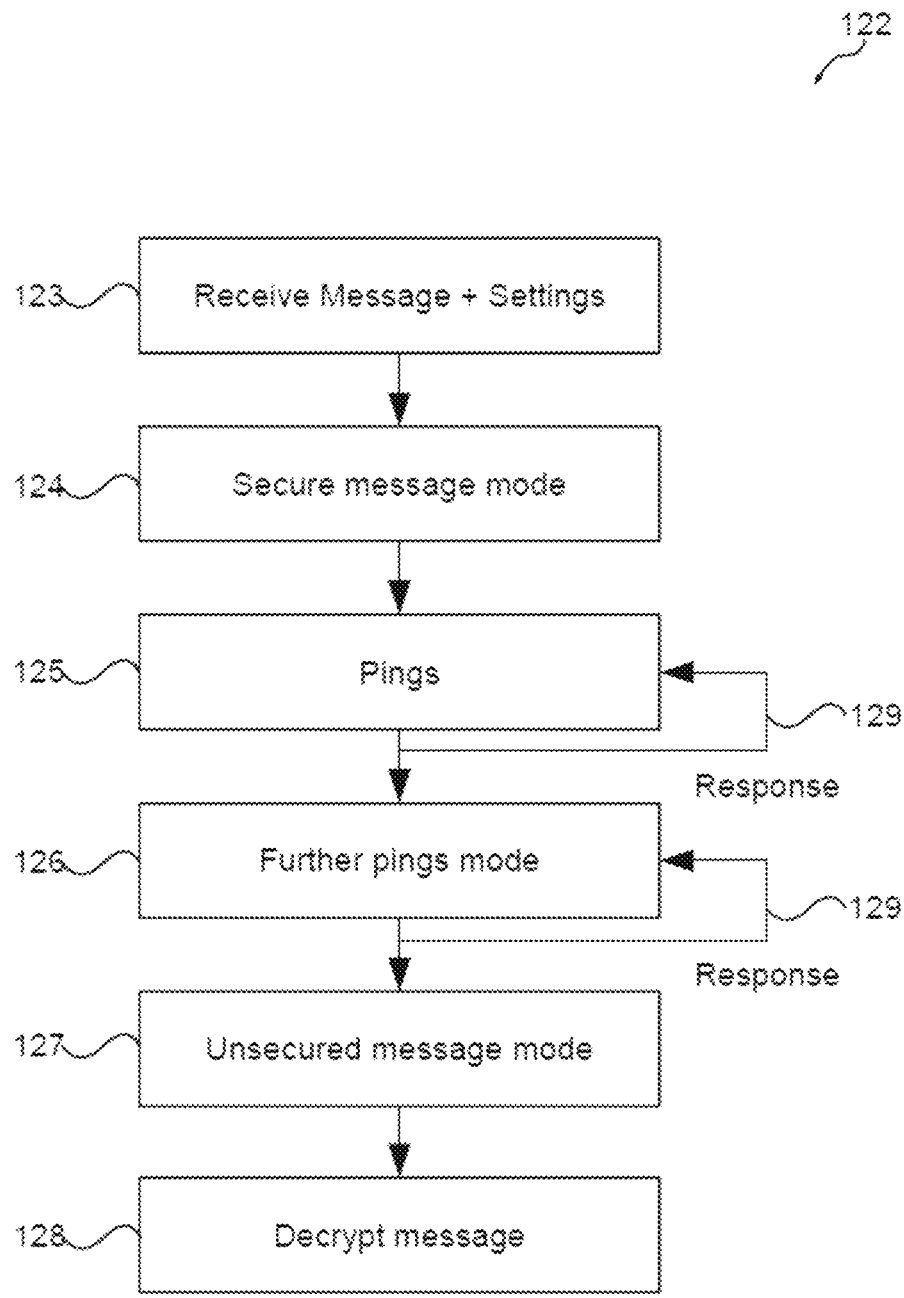
FIG. 3 shows exemplary processing of the system of FIG. 1 in accordance with an embodiment.

Now referring to FIGS. 1-3, the physical enabling structure for the method and process taught by the present invention is illustrated which is required for the invention to be enabled and function, as the hardware and other computer machine components are tied to and enable the method and process taught and described.

FIG. 1 shows a system 100 for securing electronic messages. The system 100 comprises a repository server 102 which may be in operable communication with a plurality of electronic devices 103, including via a wide area network 107, such as the Internet. The system 100 may further comprise further electronic devices 101 for off-line encrypted message storage as will be described in further detail below.

The server 102 comprises a processor 106 for processing digital data. A data storage device 109 is in operable communication with the processor 106 via system bus 105. A data storage device 109 is configured for storing digital data 110 and computer program code instructions. These computer program code instructions may be logically divided into a plurality of computer program code instruction controllers 108. In use, the processor 106 fetches the data 110 and computer program code instructions from the data storage device 109 for interpretation and execution of the computational functionality described herein.

The repository server 102 may further comprise a data interface 104 for sending and receiving data across the wide area network 107.

The electronic device 103 may further comprise the aforedescribed processor 106 in operable communication with the data storage device 109 and data interface 104.

The electronic device 103 may further comprise a digital display 111 for the display of digital information thereon, including user interfaces. The digital display 111 may comprise a haptic overlay for the receipt of user interface gestures and input in relation to digital information displayed thereon.

The controllers 108 of the electronic device 103 may be installed thereon as part of a software application.

The further electronic device 101 may similarly comprise the processor 106 in operable communication with the data storage device 109 and digital display 111.

FIG. 2 shows various data and controllers of the system 100 in further detail.

The data storage 109 data 110 of the server 102 may store electronic messages 112 and settings 113 stored in relation to the electronic messages 112. The electronic messages 112 may comprise text but may include multimedia messages and data attachments including video and/or audio in embodiments.

The controllers 108 may comprise a user interface controller 114 which may control the display of a user interface, including that which is displayed on the display 111 of the electronic device 103. The user interface controller 114 may comprise a web server serving the user interface across the wide area network 107 responsive to HTTP requests from applications executing on the electronic device 103.

The controllers 108 of the server 102 may further comprise a ping controller 115 configured for periodically transmitting pings across the wide area network 107 and awaiting responses thereto.

The controllers 108 of the server 102 may further comprise an encryption controller 116 which may encrypt and decrypt the electronic messages 112, including using cryptographic keys 117, including those which are paired with corresponding cryptographic keys 117 of electronic device 103.

The encryption controller 116 may further cryptographically sign pings and cryptographically verify responses thereto.

The controllers 108 of the electronic device 103 may comprise a ping response controller 118, configured to receive pings from the server 102 and issue responses thereto. The controllers 108 of the electronic device 103 may further comprise a ping listening controller 119 which may execute as a background process to automatically respond to pings.

The controllers 108 of the electronic device 103 may further comprise an encryption controller 116 which may encrypt and decrypt the electronic messages 112, including using cryptographic keys 117, including those which are paired with corresponding cryptographic keys 117 of server 102.

The data 110 of the electronic device 103 may similarly comprise cryptographic keys 117, including those which are paired with corresponding cryptographic keys of the server. The ping response controller 118 or the ping listener controller 119 may cryptographically verify pings from the server using the cryptographic keys 117 and cryptographically sign responses to the server 102.

The controllers 108 of the further "air gapped" electronic device 101 may comprise an encryption controller 116 configured to encrypt electronic message 112 on encryption controller 116 using cryptographic key 117 generated by server 102 and provided to the electronic device 101 by the user, thereby creating encrypted messages 120. The key may be shown on the display 111 of device 103 for the user to either enter the key manually on the device 101 or enter the key by scanning a 2d code.

The data 110 of the further "air gapped" electronic device 101 may store off-line encrypted messages 120. The controllers 108 of the further electronic device 101 may further comprise an encryption controller 116 configured to decrypt the encrypted messages 120 on encryption controller 116 using cryptographic key 117 generated by server 102 and provided to the electronic device 101 by the user. The key may be shown on the display 111 of device 103 for the user to either enter the key manually on device 101 or by scanning a 2d code.

Exemplary processing 122 of the system 100 is now provided with reference to 3.

At step 123, the server 102 may receive a message via a user interface served by the user interface controller 114 and settings 113 in relation to the message.

For each message, the ping controller 115 is configurable in a secure message mode 124 wherein the message is inaccessible and the ping controller 115 periodically pings the electronic device 103 at step 125 and receives responses 129 to the pings.

Responsive to a lack of one or more responses to one or more pings, the ping controller 115 may enter an unsecured message mode 127 wherein the message is accessible.

In embodiments, the message may be accessible wherein the encryption controller 116 decrypt the message at step 128.

The ping controller 115 may operate by sending Internet Control Message Protocol (ICMP) echo request packets to the electronic device 103 and waiting for an ICMP echo reply.

The electronic device 103 may authenticate with the server 102 wherein the server 102 stores an IP address of the electronic device 103. As such, the ping controller 115 may transmit the ICMP echo packet requests to the stored IP address.

The ping controller 115 may receive responses in other ways. For example, the ping controller 115 may receive a response to a ping via the user interface served by the user interface controller 114 wherein the user logs into the server 102 using secure authentication credentials to respond to a ping.

In accordance with this embodiment, the ping may be a device notification or, in further embodiments, an SMS or email electronic communication.

The settings 113 may specify the type of ping to be transmitted by the server 102 so as to allow for utilization of various types of electronic devices 103 having differing capabilities. Settings may further identify ping recipients, such as by specifying mobile phone numbers for SMS messages, email addresses for email messages, device notification recipient identifiers for device notifications and the like.

In embodiments, the ping response controller 118 may display a prompt on the digital display 111 of the electronic device 103 responsive to a device notification wherein user interaction therewith causes the ping response controller 118 to transmit a response to the server 102.

As is shown in FIG. 3, at step 125, the ping controller 115 may be configurable in a first ping mode wherein the ping controller periodically pings according to first ping mode settings of the settings 113 and, responsive to a lack of one or more responses to one or more pings, to enter into a second ping mode at step 126 wherein the ping controller 115 pings according to second ping mode settings of the settings 113.

The ping controller 115 may transmit pings at a higher frequency in the second ping mode 126 as compared to the first ping mode 125.

Furthermore, the ping controller 115 may ping another electronic device specified by the second ping mode settings.

Furthermore, the ping controller 115 may transmit different types of ping in the second ping mode specified by the second ping mode settings. For example, a first ping type of the first ping mode may be an ICMP echo packet request type whereas a ping type of the second ping mode may be an email communication type.

When receiving a ping, the ping response controller 118 may display a prompt on the digital display 111 and transmit a response to the server 102 according to user input responsive to the prompt.

The prompts may simply comprise a button which may be pressed in confirmation to cause the ping response controller 118 to transmit the response to the server 102. Alternatively, the prompt may request a key (such as a PIN, password or the like) and wherein the ping response controller 118 verifies the key prior transmitting the response.

Similarly, the type of prompt may vary between the first and second ping modes. For example, during the first ping mode, the ping response controller 118 may respond automatically to ping request or alternatively only require the user to depress a button of the displayed prompt in confirmation. However, during the second ping mode, the ping response controller 118 may require the key to be input via the prompt.

The ping listener controller 119 may operate as a background process so as to automatically respond to pings without user intervention.

Each ping may be cryptographically signed by the ping controller 115 using the cryptographic keys 117 and verified by the ping response controller 118 or ping listener controller 119 using corresponding cryptographic keys 117.

For example, each ping may be cryptographically signed using a private key of a cryptographic key 117 associated with electronic device 103 and wherein the ping response controller 118 verifies the ping using a corresponding public key of the cryptographic key 117 associated with the electronic device. In some cases, the pings may be cryptographically signed by server 102 using a common private key of a cryptographic key 117 used across the system and therefore not associated with a specific electronic device.

In embodiments, the ping response controller 118 is configured to request a key (such as a PIN, password or the like) via a prompt displayed on the display 111 which is then used to retrieve the private cryptographic key. The cryptographic key may be secured using a hardware security module only accessible by the provision of the correct key.

Similarly, the ping response controller 118 or ping listener controller 119 may cryptographically sign the response using the cryptographic keys 117 which is correspondingly verified by the server 102. For example, the ping response may be cryptographically signed using a private key of the cryptographic keys 117 associated with electronic device 103 wherein, upon receipt of the response, the server 102 retrieves the corresponding public key from the cryptographic keys 117 associated with the electronic device 103. The server 102 may retrieve the appropriate cryptographic keys 117 by inspecting the IP address, email address, secure account ID or other identifier of the electronic device or user account associated therewith.

In embodiments, the electronic messages 112 may be pre-encrypted on the electronic device 103 by using cryptographic key 117 generated on the server 102 or on the user electronic device 103, or by using a key derivation password generated on the server 102 or on the user electronic device 103, or by using a key derivation password provided by the user on electronic device 103. This key may be provided to the recipient of the message by the user themselves or by the system. However, the key may not be stored on the system thereby preventing decryption of the electronic message using data stored by the server itself. The pre-encrypted electronic messages may be further encrypted by the server for further security.

In embodiments, prior to entering the unsecured message mode for the message, the ping controller 115 is configured to verify the actual number of pings transmitted in relation to message against a calculated estimated number of pings.

In embodiments, encrypted messages 120 may be stored off-line by the further electronic device 101 wherein the data 110 of the server 102 stores a cryptographic key for the description thereof. As such, in the unsecured message mode, the server 102 may rather provide the cryptographic key usable for decryption of the encrypted message 120 stored on the further device 101. As alluded to above, the further electronic device may comprise an encryption controller 116 configured to encrypt or decrypt the electronic message 120 using the provided cryptographic key. The further electronic device 101 may not be connected to the wide area network 107 to prevent unauthorized access thereof via the wide area network 107. In this regard, the cryptographic key may be input via a user interface displayed by the further electronic device 101 or alternatively scanned by the further electronic device 101 from a computer readable media (such as a 2D code).

In embodiments, the encrypted messages 120 may be stored off-line on a physical media such as CD-ROM, flash drives, hard copy print outs, or the like. if the further electronic device is not available to the user. The hard copy print outs may be in binary, hexadecimal, base 32 and other encodings including QR codes that may be input to or scanned by electronic device 103 for future decryption.

In embodiments, the user interface controller 114 is configurable in an invisible mode wherein the electronic messages 112 are not evident via the user interface. As such, messages 112 may not be tampered with even if an unauthorized user gains access to the user account on server 102 or on electronic device 103.

In further embodiments, the user interface controller 114 is configurable in a read-only mode wherein the electronic messages 112 are not editable via the user interface, similarly to prevent tampering by unauthorized users.

In further embodiments, the user interface controller 114 is configurable in a delete disabled mode wherein the electronic message 112 is not able to be deleted via the user interface, similarly to prevent erasure by unauthorized users.

In embodiments, prior entering the unsecured message mode, the ping controller 115 is configured to transmit a one-time key (such as a PIN, password or the like) and only enter the unsecured message mode upon subsequent receipt of the key. The sending of the one-time key may be determined by the settings 113.

In embodiments, the encryption controller 116 is configured for generating a cryptographic key pair 117 in relation to an associated user or electronic device identifier. As such, subsequent messages may be encrypted using the same cryptographic key pair 117.

In embodiments, a private key of the key pair 117 is not stored by the server for enhanced encryption. For example, when generating the cryptographic key pair 117, the server 102 may store the public key thereof and display (or otherwise provide) the private key thereof via the user interface served by the user interface controller 114 but wherein the private key is not stored by the server 102. As such, the user may store the private key or alternatively the electronic device 103 may automatically store the private key within the data 110 thereof. The cryptographic key pair 117 may also be alternatively generated by the encryption controller 116 on the electronic device 103 and the device security hardware module may be used to secure the private key while the public key may be sent to the server 102 for future encryptions of messages addressed to the same user.

As such, it would not be possible to decrypt an encrypted messages using the data 110 stored by the server alone, thereby preventing against unauthorized access.

The term "approximately" or similar as used herein should be construed as being within 10% of the value stated unless otherwise indicated.

Figure 4:
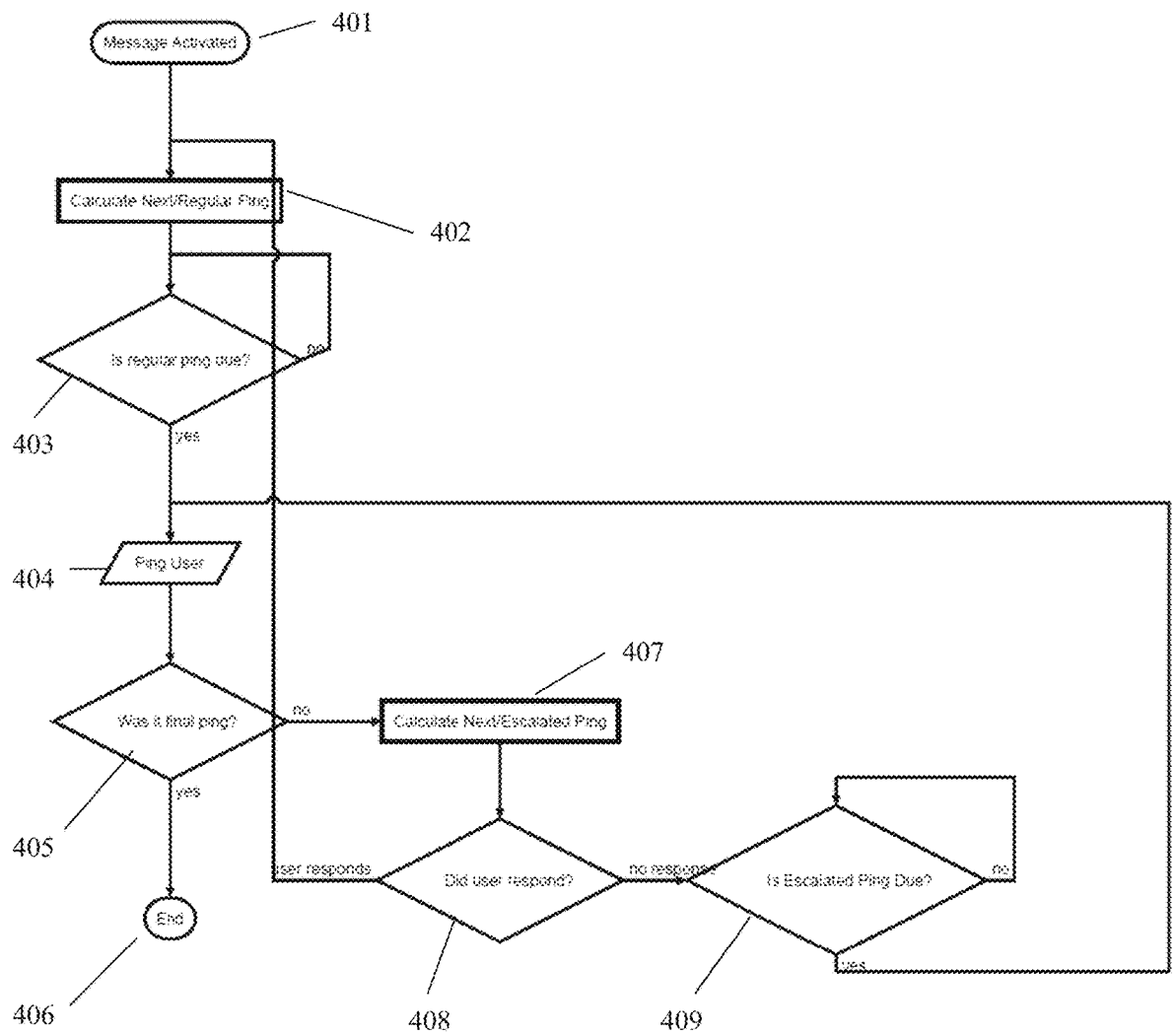
FIG. 4 is a flow chart illustrating a first ping logic method and process as taught by the present invention.

Now referring to FIG. 4 a flow chart illustrating a first ping logic method and process as taught by the present invention is shown. In this embodiment of the present invention, the process starts when a message is activated 401. Next, the system determines by calculation when the next/regular ping will occur 402. The system then determines when the next regular ping is due 403 and when the ping is due is due, the system generates a ping to the user 404.

After generating and sending a ping to the user 404, the system next determines if that ping was the final ping 405. If the ping 404 was the final ping 405, then the ping process ends 406. Message release algorithm FIG. 7 performs the task of releasing the message.

If the ping 404 was not the final ping 405, the system next calculates the next/escalated ping 407 and determines if the user has responded 408. If the user does respond, the system returns to the logic/process loop and proceeds to calculate when the next/regular ping will occur 402.

If the uses does not respond 408 after the next/escalated ping calculation 407, the system them determines if the next/escalated ping is due 409 and when the ping is due is due, the system generates a ping to the user 404 followed by determining if that ping 404 was the final ping 405.

Figure 5:
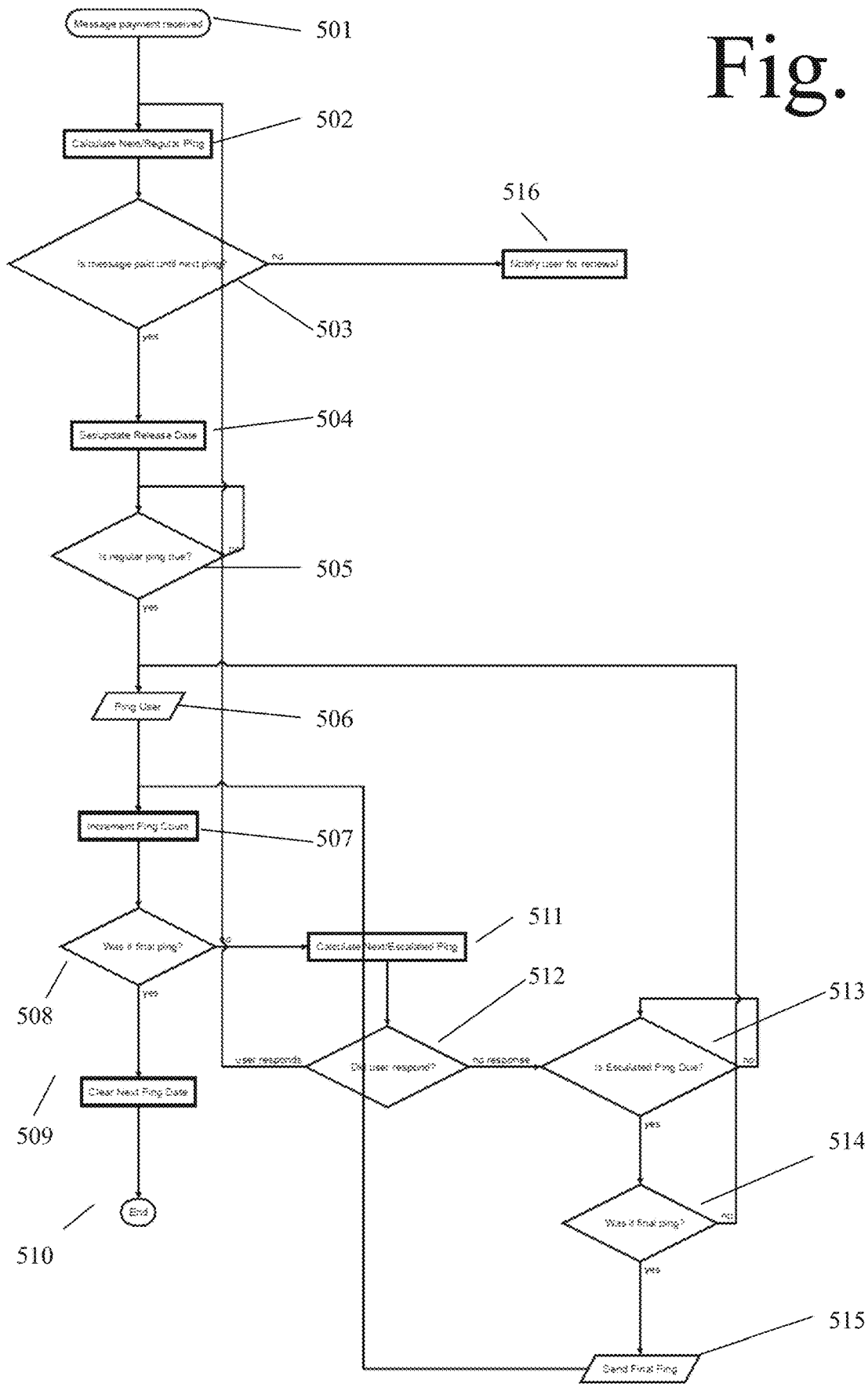
FIG. 5 is a flow chart illustrating a second ping logic method and process as taught by the present invention.

FIG. 5 is a flow chart illustrating a second ping logic method and process as taught by the present invention. Here, once message payment is received 501, the system calculates when the next/regular ping is due 502. The system then determines if/when is the message paid until the next ping 503.

If the message is not paid, the user is notified for renewal 516.

If the message is paid 503, the system then either sets or updates the release date 504. The system then determines when the next regular ping is due 505 and when the ping is due is due, the system generates a ping to the user 506.

After generating and sending a ping to the user 506, the system updates an incremental ping count 507 and next determines if that ping was the final ping 508. If the ping 506 was the final ping 508, the system clears the next ping date 509 and then the ping process ends 510. Then message release algorithm FIG. 7 performs the task of releasing the message.

If the ping 506 was not the final ping 508, the system next calculates the next/escalated ping 511 and determines if the user has responded 512.

If the user does respond, the system returns to the logic/process loop and proceeds to calculate when the next/regular ping will occur or is due 505.

If the uses does not respond 512 after the next/escalated ping was calculated 511, the system then determines if the next/escalated ping is due 513 and when the ping is due is due, the system generates a ping to the user followed by determining if that ping was the final ping 514.

If the ping was the final ping 515, the incremental ping count 507 is updated, the final ping is confirmed 508, the next ping date is cleared 509 and the ping process ends 510. Then message release algorithm FIG. 7 performs the task of releasing the message.

If the ping was not the final ping 515, the user is pinged 506, the incremental ping count is updated 507, the non-final ping is confirmed 508, and the next/escalated ping is calculated 511.

If the user does respond, the system returns to the logic/process loop and proceeds to calculate when the next/regular ping will occur or is due 505.

If the uses does not respond 512 after the next/escalated ping is calculated 511. The system them determines if the next/escalated ping is due 513 and when the ping is due is due, the system generates a ping to the user followed by determining if that ping was the final ping 514.

Figure 6:
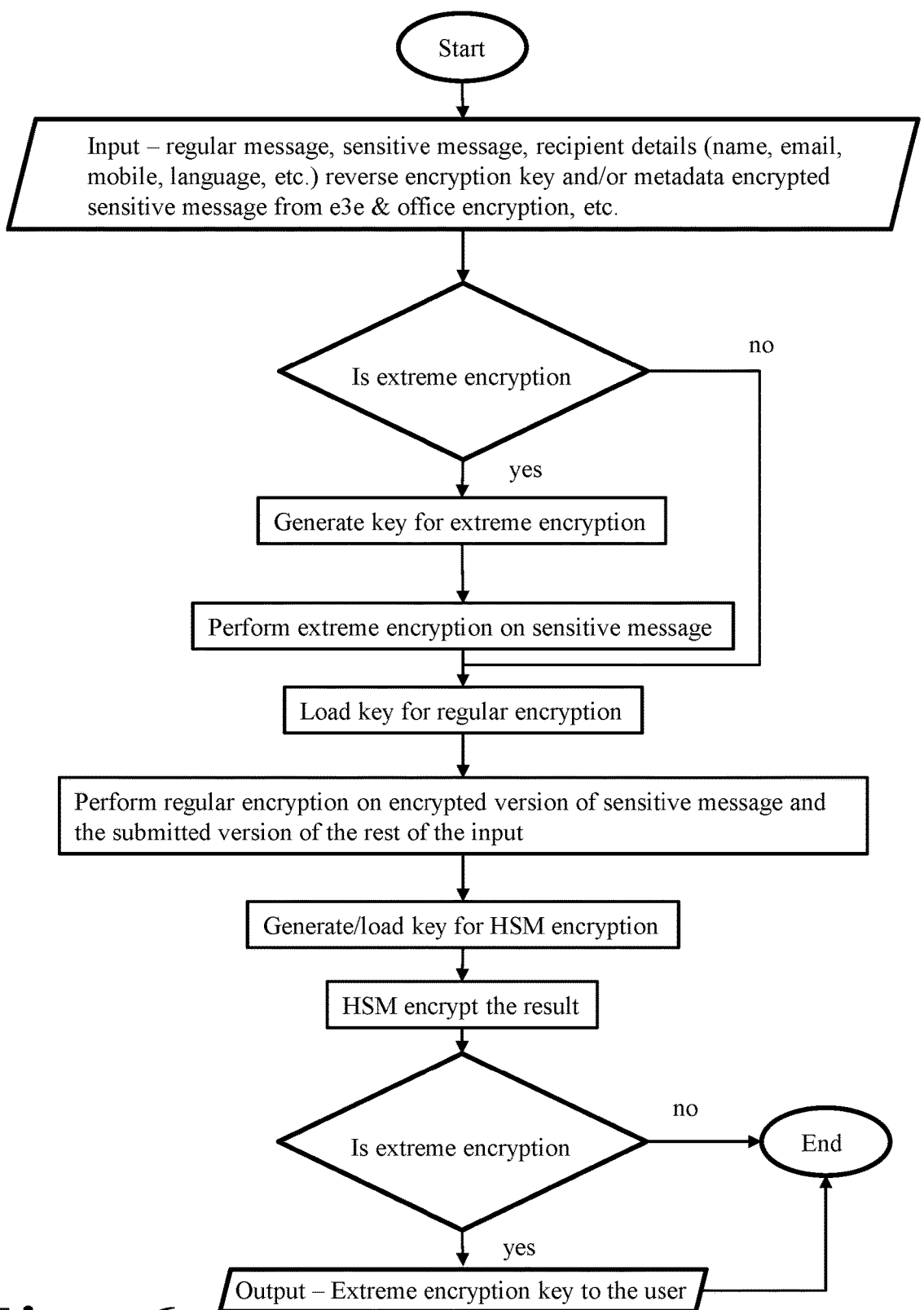
FIG. 6 is a flow chart illustrating the encryption logic taught and used by the present invention.

FIG. 6 is a flow chart illustrating the encryption logic taught and used by the present invention. Here the encryption logic starts and regular message, sensitive message, recipient details (name, email, language, etc.), reverse encryption key and/or metadata, encrypted sensitive message from e2e (end to end) and offline encryption, etc. are received as inputs and the system checks for extreme encryption.

If there is no extreme encryption, the system loads a key for regular encryption, performs regular encryption the submitted version of the input, generates and loads a key for HSM encryption, HSM encrypts the result and the process ends.

If extreme encryption is requested, a key is generated for extreme encryption. The system performs extreme encryption, which may just mean adding a layer of encryption on the sensitive message where user keeps the key, and loads the key for regular encryption and performs general encryption on extreme encrypted version of the sensitive data and the rest of the output. Finally, the system generates or loads a key for HSM encryption, HSM encrypts the result, outputs the key for extreme encryption to the user and the process ends.

Figure 7:
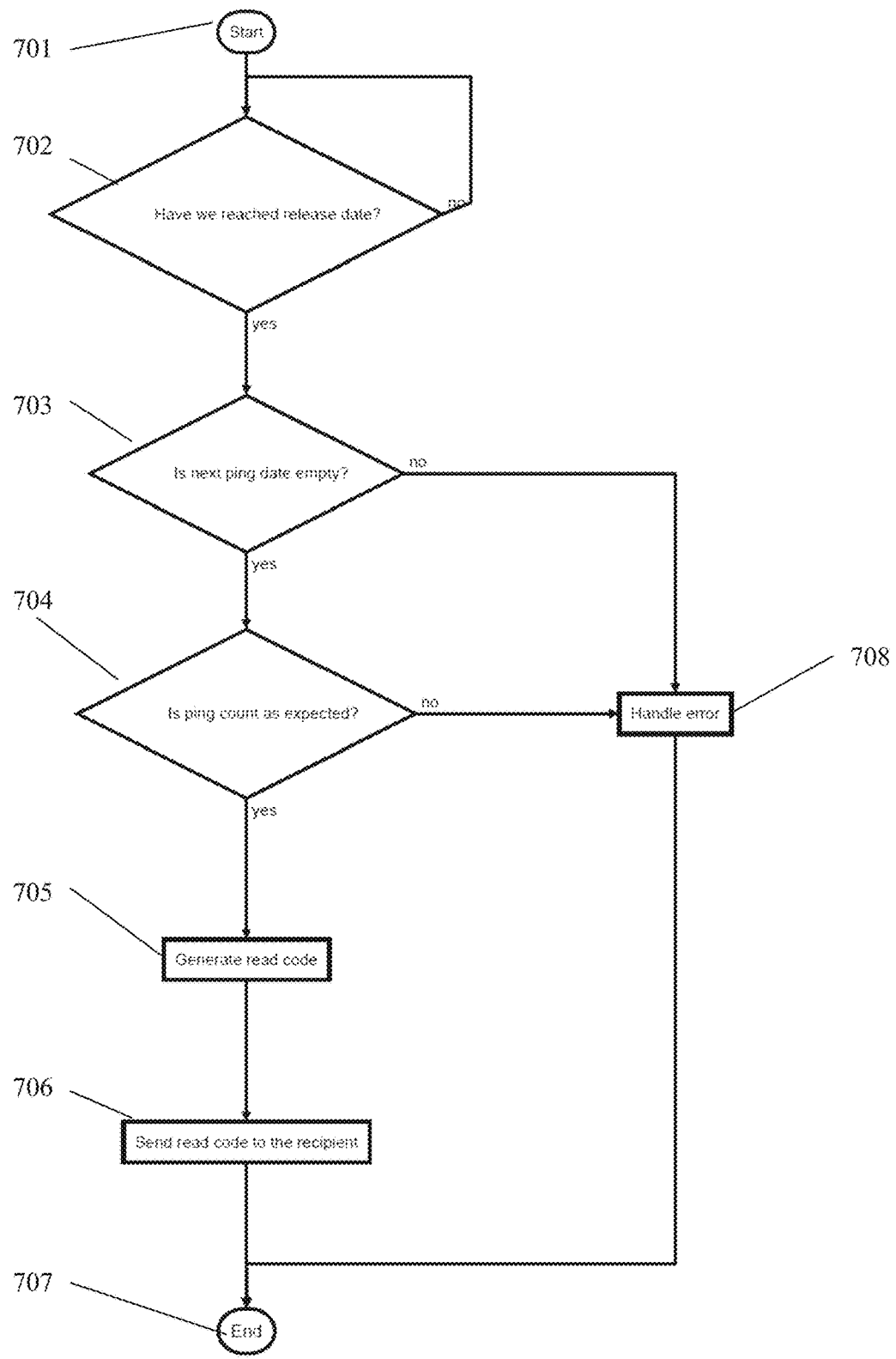
FIG. 7 is a flow chart illustrating the release logic taught and used by the present invention.

FIG. 7 is a flow chart illustrating the release logic taught and used by the present invention. The release logic starts 701 if/when the system determines that the release date has been reached 702.

Once the release date has been reached 702, the system checks to see if the next ping date is empty 703.

If the next ping date is not empty, a handling error is returned 708 and the process ends 707.

If the next ping date is empty 703, the system proceeds to check if the ping count is as expected 704.

If the next ping date is not as expected, a handling error is returned 708 and the process ends 707.

If the next ping date is as expected, the system generates a read code 705 and sends the read code to the recipient 706 and the process ends 707.

Figure 8:
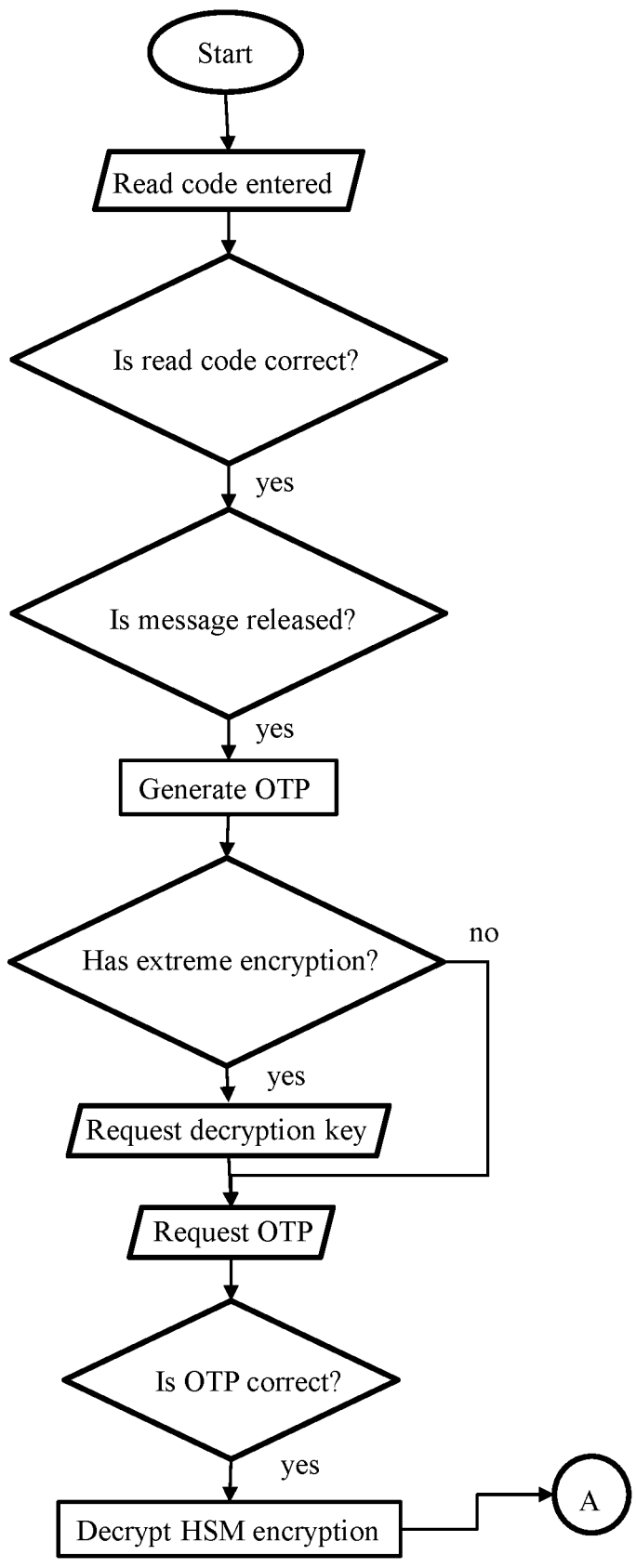
FIGS. 8-9 is a flow chart illustrating the read and decryption logic taught and used by the present invention.
Figure 9:
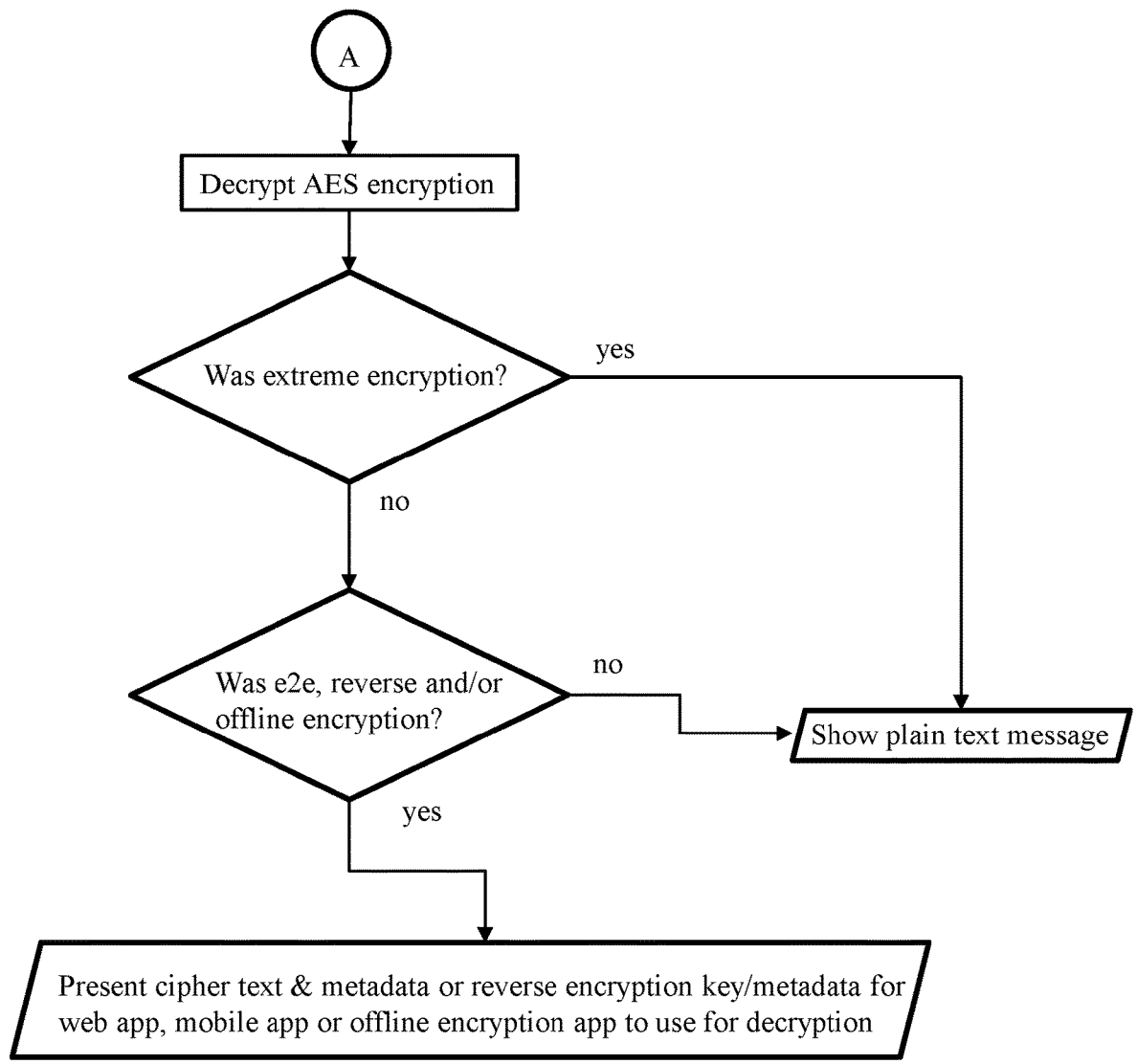

FIGS. 8-9 is a flow chart illustrating the read and decryption logic taught and used by the present invention. The read and decryption process starts when the read code is entered and proceeds if the read code is correct and the message is released. A OTP is generated and the system determines if extreme encryption is present.

If no extreme encryption is used, the process continues to making a request for OTP.

If extreme encryption is confirmed, a request for a decryption key is made, the process continues to making a request for OTP.

After the request for OTP is reached, the system confirms the OTP is correct and decrypts the HSM encryption and decrypts AES encryption.

If the encryption was extreme encryption, the extreme encryption on the sensitive data is decrypted using the key that was provided earlier and the plain text for all input fields (recipient details, regular message, sensitive message, etc.) are sent to the client.

If the encryption was extreme not encryption, the system next determines if the encryption was end to end (E2E), offline or reverse encryption.

If the encryption was neither of e2e, offline and reverse, plain text of the message fields (recipient details, regular message, etc.) are shown.

If the encryption was e2e, offline or reverse, cipher text & metadata or reverse encryption key and/or metadata for webapp, mobile app or offline encryption app is presented to user for decryption of the sensitive data. Other message data (recipient details, regular message, etc.) are presented to the client in plain text.

In an alternative embodiment, a first layer may be extreme/offline encryption if enabled/chosen (AES 128/256 depending on required key length but most probably set in stone to AES 256). It would be followed by a regular AES-256 encryption and then HSM RSA-4096, both of which happen on all messages. With HSM, the key is locked/secured inside the hardware security module so that data breaches may not expose messages.

In another alternative embodiment, a user can select the communication language for their recipient. When the message is due for release, the email/SMS/other communication sent to the recipient (with instructions on who left the message and when and how to read the message) will be sent in that chosen language.

In still another alternative embodiment, messages to recipients can be sent to their email or mobile. In future, more options may be added such as letters, public posts asking them to come forwards, phone calls, using agents, etc.

In yet another alternative embodiment, a time based one time password (TOTP) or second factor authentication can be incorporated into the present invention. Currently a user needs One Time Password (OTP) sent to their email for users to view/edit/delete messages. For recipients, OTP is sent to email/SMS to view/read a released message. In the next phases, TOTP will be added. HOTP may also get added later on.

In another alternative embodiment, Users can set up a 4 digit pin on the mobile app for quicker access. When this is setup, the system creates an EC private key on the system and sends the public key to the backend. Request signature (ECDSA) along with the PIN is used to perform the login. The ECDSA signature is also used to bypass second factor auth such as Email OTP, TOTP, HOTP, etc. when viewing/editing/deleting messages on the registered mobile app.

In future, the system may switch from 4 digit PIN to biometrics such as fingerprints and face ids.

Figure 17:
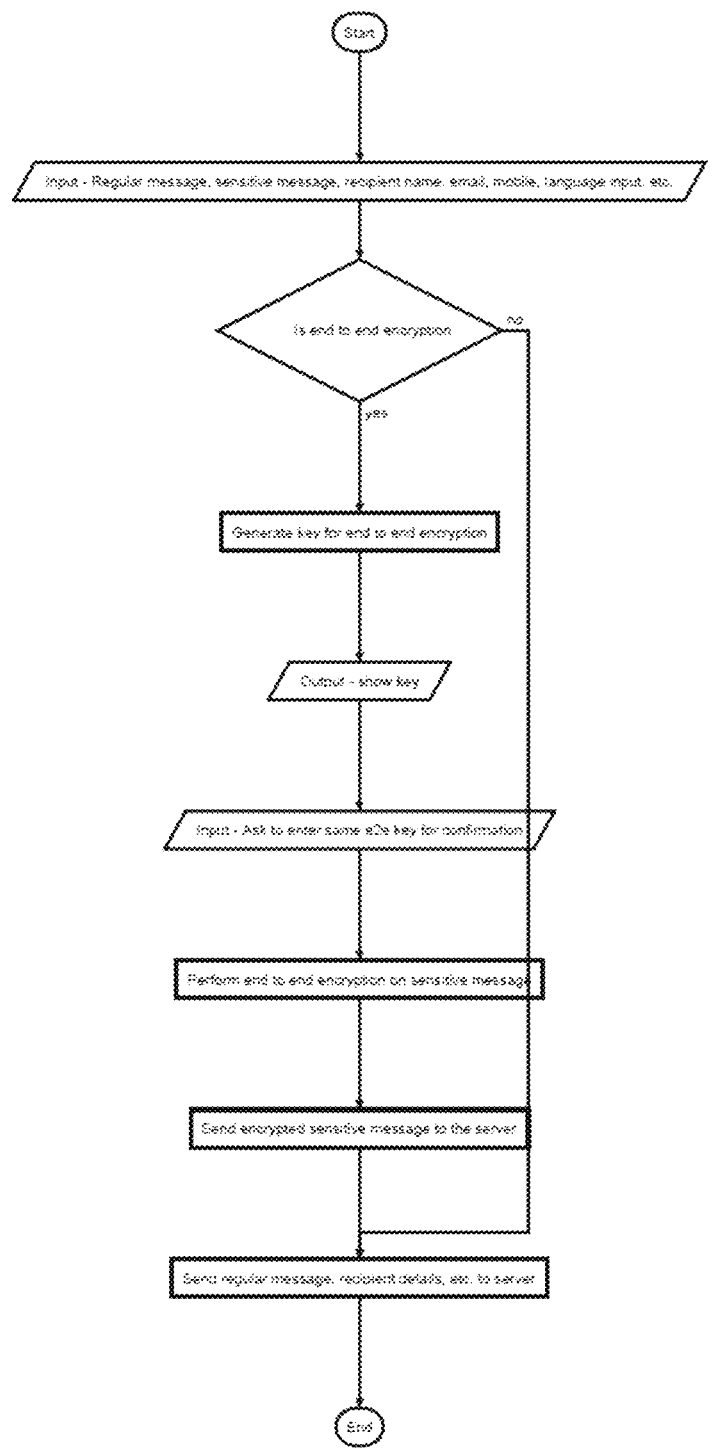
FIG. 17 is a flow chart illustrating the E2E Encryption Client Side Logic

FIG. 17 is a flow chart illustrating the E2E Encryption Client Side Logic. This process starts with the receipt of an input such as a Regular message, sensitive message, recipient name, email, mobile, language input, etc. Next the system decides if there is end to end encryption. If not, the process proceeds to Send regular message, recipient details, etc. to the server and ends. If there is end to end encryption, the system generates a key for the end to end encryption, and output will show the key and an input will Ask to enter same e2e key for confirmation. Next the system will Perform end to end encryption on sensitive message and Send encrypted sensitive message to the server. Finally, the system the process proceeds to Send regular message, recipient details, etc. to the server and ends.

Figure 18:
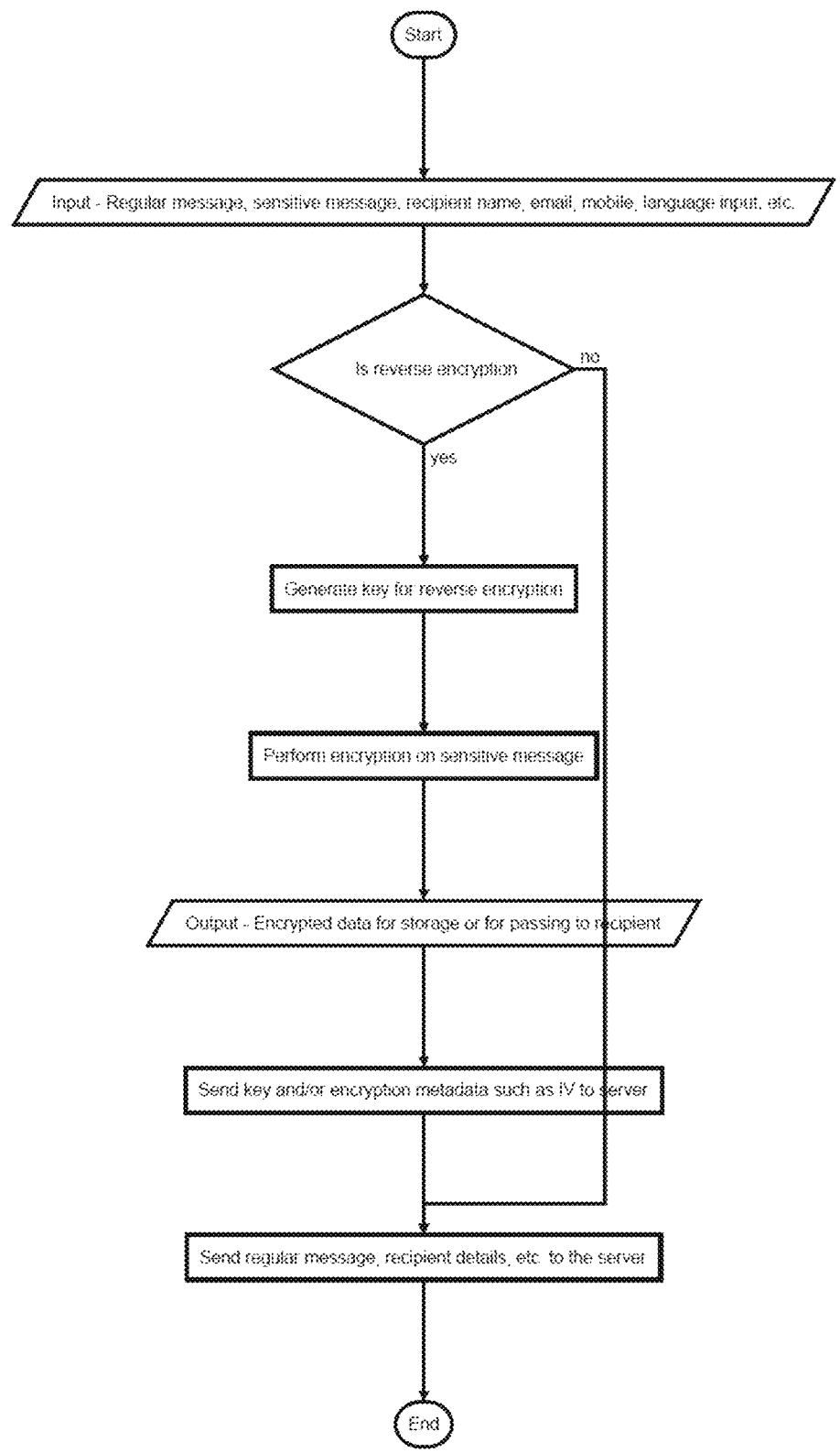
FIG. 18 is a flow chart illustrating the reverse encryption logic taught by the present invention.

FIG. 18 is a flow chart illustrating the reverse encryption logic taught by the present invention. This process starts with an input such as a Regular message, sensitive message, recipient name, email, mobile, language input, etc. Next the system decides if there is reverse encryption. If not, the process proceeds to Send regular message, recipient details, etc. to the server and ends. If there is reverse encryption, the system performs encryption on a sensitive message, and output created encrypted data for storage or for passing to recipient. Next the system will send key and/or encryption metadata such as IV to the server. Finally, the system the process proceeds to Send regular message, recipient details, etc. to the server and ends.

Figure 19:
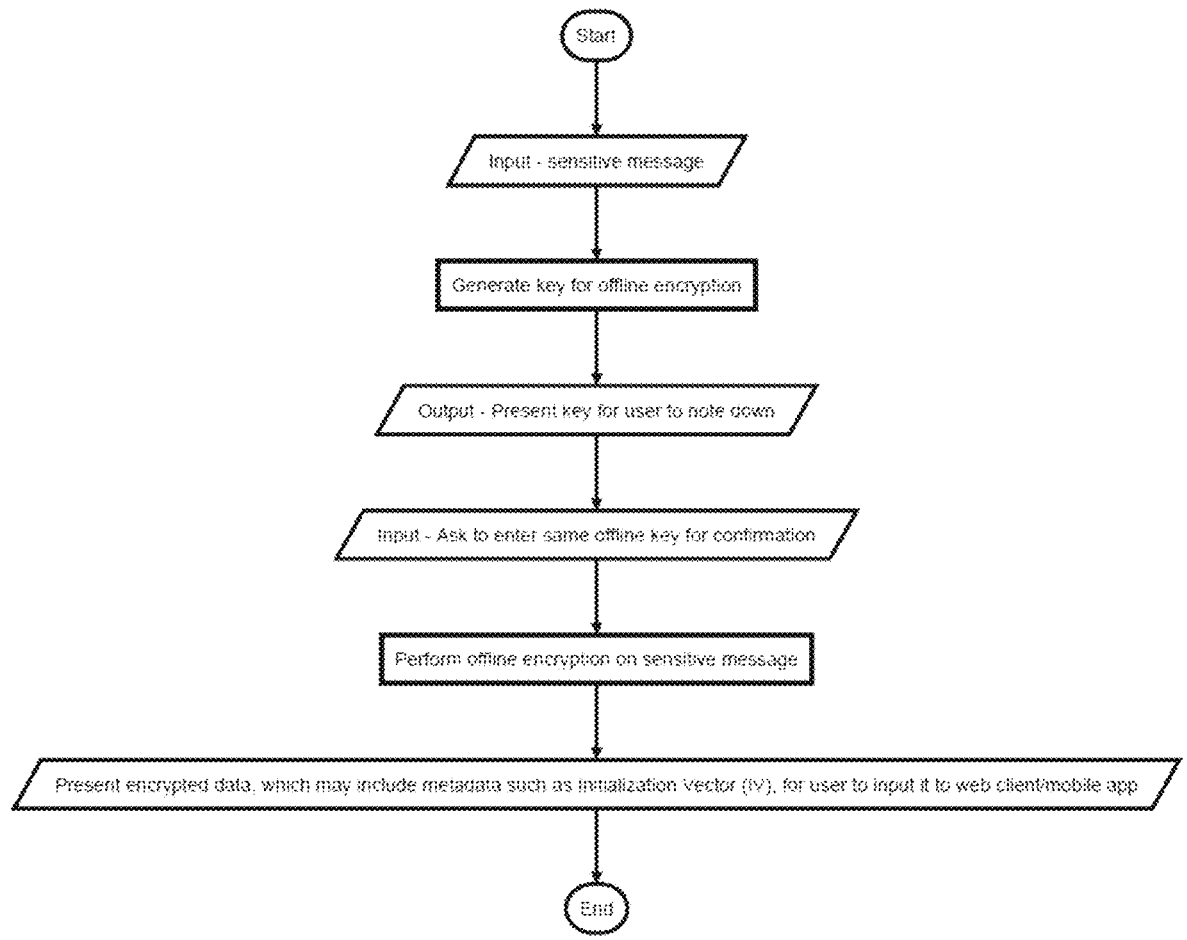
FIG. 19 is a flow chart illustrating the offline encryption using a separate encryption application with no internet connection.

FIG. 19 is a flow chart illustrating the offline encryption using a separate encryption application with no internet connection. The process start with the input of a sensitive message. Next a key is generated for offline encryption. An output is generated as a key for the user to note down. A second input asks the user to enter the same offline key for confirmation. Next the system performs offline encryption on the sensitive message. Finally, the system presents encrypted data, which may include metadata such as Initialization Vector (IV), for user to input it to web client/mobile app and ends.

Figure 20:
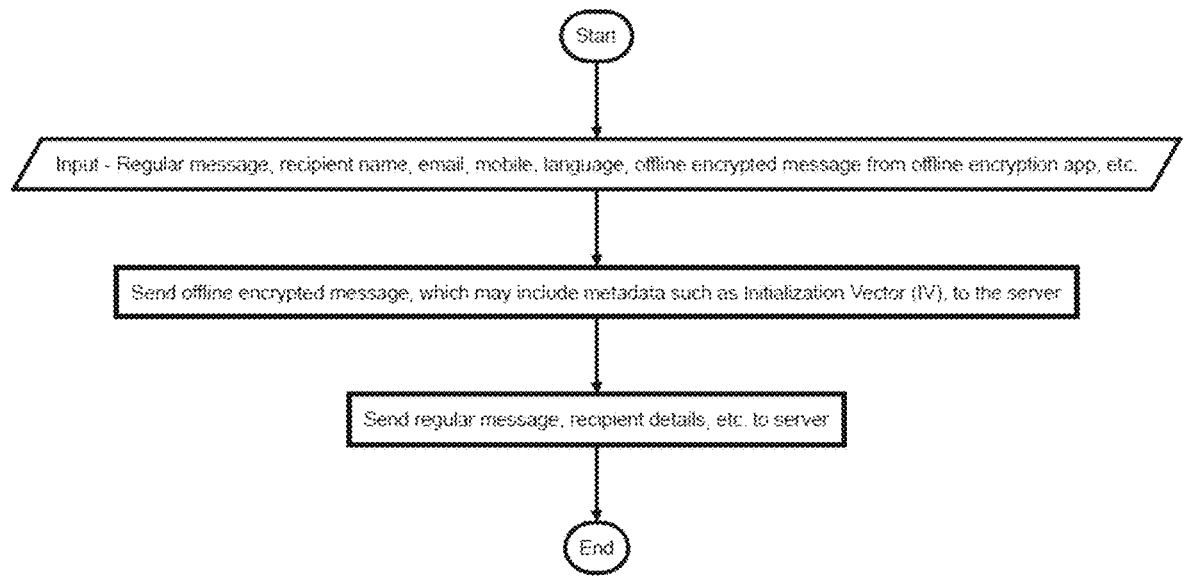
FIG. 20 is a flow chart illustrating the web client logic for offline encryption.

FIG. 20 is a flow chart illustrating the web client logic for offline encryption. This process starts with input such as a Regular message, recipient name, email, mobile, language, offline encrypted message from offline encryption app, etc. Next the system sends an offline encrypted message, which may include metadata such as Initialization Vector (IV), to the server. Finally, the system sends a regular message, recipient details, etc. to the server and ends.

Figure 21:
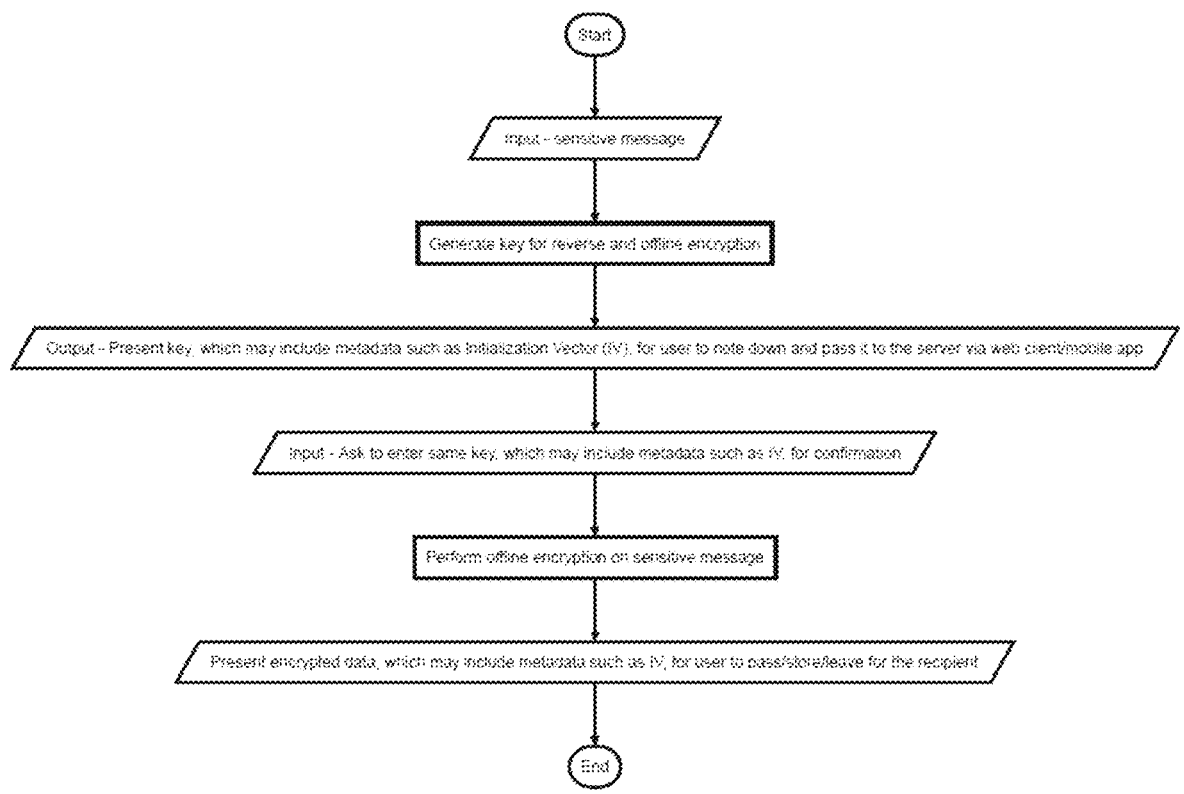
FIG. 21 is a flow chart illustrating the reverse and offline encryption using a separate encryption application with no internet connection.

FIG. 21 is a flow chart illustrating the reverse and offline encryption using a separate encryption application with no internet connection. This process started with the input of a sensitive message. Next the system generates a key for reverse and offline encryption. Output is then generated as a present key, which may include metadata such as Initialization Vector (IV), for user to note down and pass it to the server via web client/mobile app. Input is requested by prompting the user to enter the same key, which may include metadata such as IV, for confirmation. Next the system performs offline encryption on the sensitive message. Finally, the system presents encrypted data, which may include metadata such as IV, for user to keep/store/pass/leave for the recipient and ends.

Figure 22:
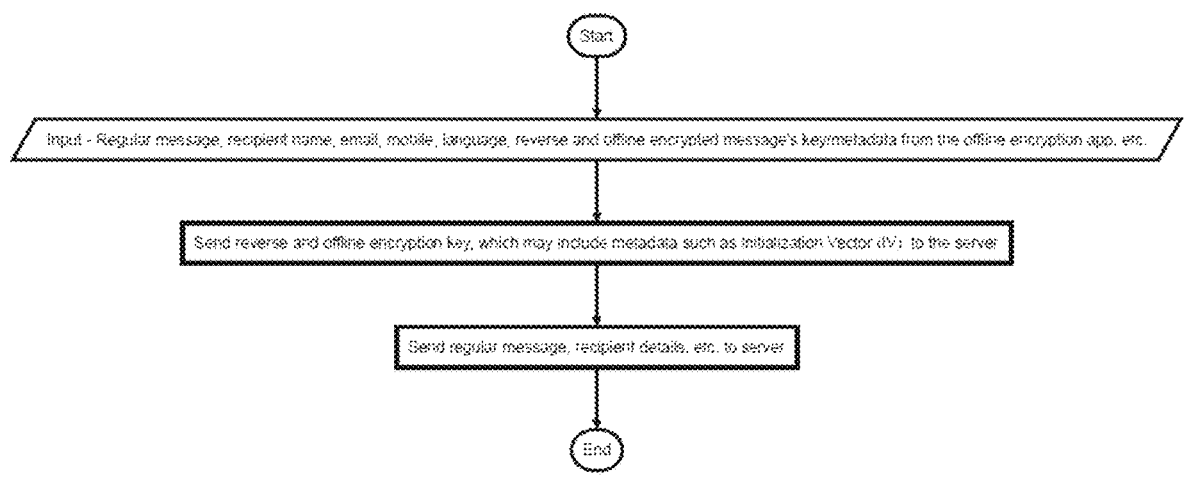
FIG. 22 is a flow chart illustrating the web client logic for reverse and offline encryption.

FIG. 22 is a flow chart illustrating the web client logic for reverse and offline encryption. This processes starts with the input of a regular message, recipient name, email, mobile, language, reverse and offline encrypted message's key/metadata from the offline encryption app, etc. Next the system send a reverse and offline encryption key, which may include metadata such as Initialization Vector (IV), to the server. Finally, the system sends regular message, recipient details, etc. to the server and ends.

The system is set to run on a computing device or mobile electronic device. A computing device or mobile electronic device on which the present invention can run would be comprised of a CPU, Hard Disk Drive, Keyboard, Monitor, CPU Main Memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A system for securing electronic messages comprising:
   a repository server comprising:
      data storage storing
      electronic messages
      and settings in relation to the messages,
   a processor executing computer program code instruction controllers including:
      a user interface controller exposing a user interface for configuring of the electronic messages and settings;
      a ping controller, wherein, for each message, the ping controller configurable in:
         a secure message mode wherein:
            the message is inaccessible;
            the ping controller:
               periodically pings an electronic device according to the settings; and
               receives responses to pings; and
            is responsive to a lack of one or more responses to one or more pings, to enter an unsecured message mode wherein the message is accessible.

2. The system as claimed in claim 1, wherein the ping controller receives responses to the ping via the user interface.

3. The system as claimed in claim 1, wherein the ping controller is configurable in:
   a first ping mode wherein the ping controller pings according to first ping mode settings of the settings and, is responsive to a lack of one or more responses to one or more pings, to enter into a second ping mode wherein the ping controller pings according to second ping mode settings of the settings.

4. The system as claimed in claim 3, wherein the ping controller transmits pings at a higher frequency in the second ping mode as compared to the first ping mode.

5. The system as claimed in claim 3, wherein the ping controller pings a second electronic device specified by the second ping mode settings.

6. The system as claimed in claim 3, wherein the ping controller is configured to verify a response in the any ping mode.

7. The system as claimed in claim 3, wherein the ping controller transmits a different type of ping in the second ping mode specified by the second ping mode settings.

8. The system as claimed in claim 7, wherein a ping type of the first ping mode is an ICMP echo packet request type whereas a ping type of the second ping mode is an email communication type.

9. The system as claimed in claim 1, wherein, when receiving a ping, a processor of the electronic device executes a ping response controller which displays a prompt on a digital display thereof and transmits a response to the server according to user input responsive to the prompt.

10. The system as claimed in claim 1, wherein at least one electronic message comprises a cryptographic key and wherein the settings stored in relation thereto indicate that the message comprises a cryptographic key and wherein the system further comprises a further electronic device comprising an encrypted message able to be decrypted with the cryptographic key.

11. The system as claimed in claim 10, wherein the user input comprises a key and wherein the ping response controller verifies the key prior transmitting of the response.

12. The system as claimed in claim 11, wherein the further electronic device comprises an encryption controller which decrypts the encrypted message responsive to receipt of the cryptographic key.

13. The system as claimed in claim 11, wherein the further electronic device is not connected to the server or the electronic device via a data network.

14. The system as claimed in claim 11, wherein
   the encryption controller encrypts at least one electronic message using a cryptographic key generated by server; and
   the electronic device is configured to scan the cryptographic key.

15. The system as claimed in claim 1, wherein, upon receipt of an electronic message, an encryption controller of the repository server generates a cryptographic key pair in relation to an associated user identifier or electronic device identifier and wherein a public key of the key pair is subsequently used to encrypt further messages associated with the user identifier.

16. The system as claimed in claim 15, wherein the cryptographic key pair is generated by an electronic device associated with the user identifier.

17. The system as claimed in claim 15, wherein a private key of the key pair is not stored by the server.

18. The system as claimed in claim 1, wherein the message is encrypted by a cryptographic key which is not stored by the server.

19. The system as claimed in claim 18, wherein a message recipient decrypts the message using the cryptographic key once the encrypted message is accessible.

20. The system as claimed in claim 18, wherein the cryptographic key is generated by the server or a user electronic device.

* * * * *